Oct. 19, 1937.　　　　W. W. SAYERS　　　　2,096,409
STRAIGHT LINE COLLECTOR
Filed June 13, 1935　　　　4 Sheets-Sheet 1
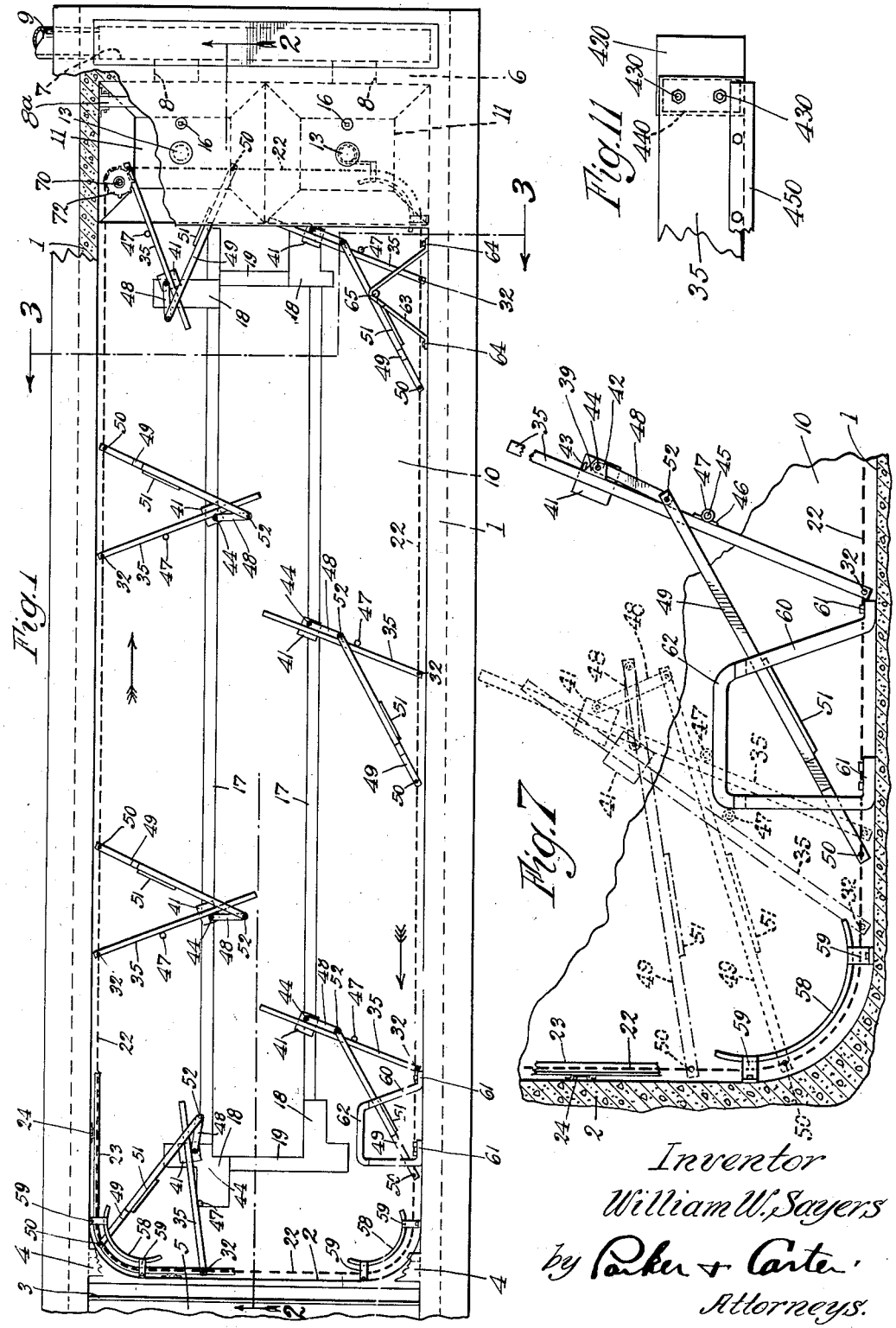
Inventor
William W. Sayers
by Parker + Carter
Attorneys.

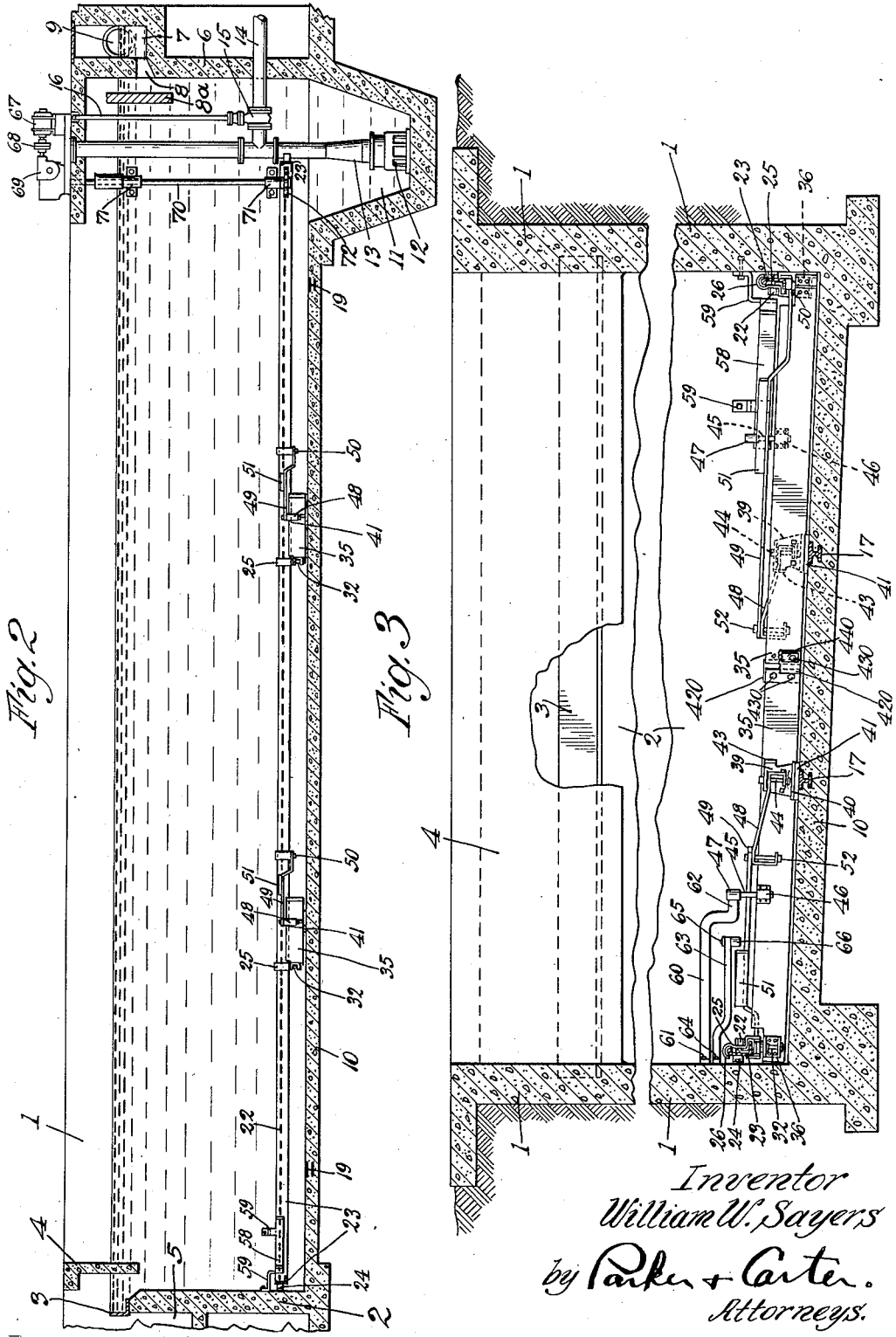

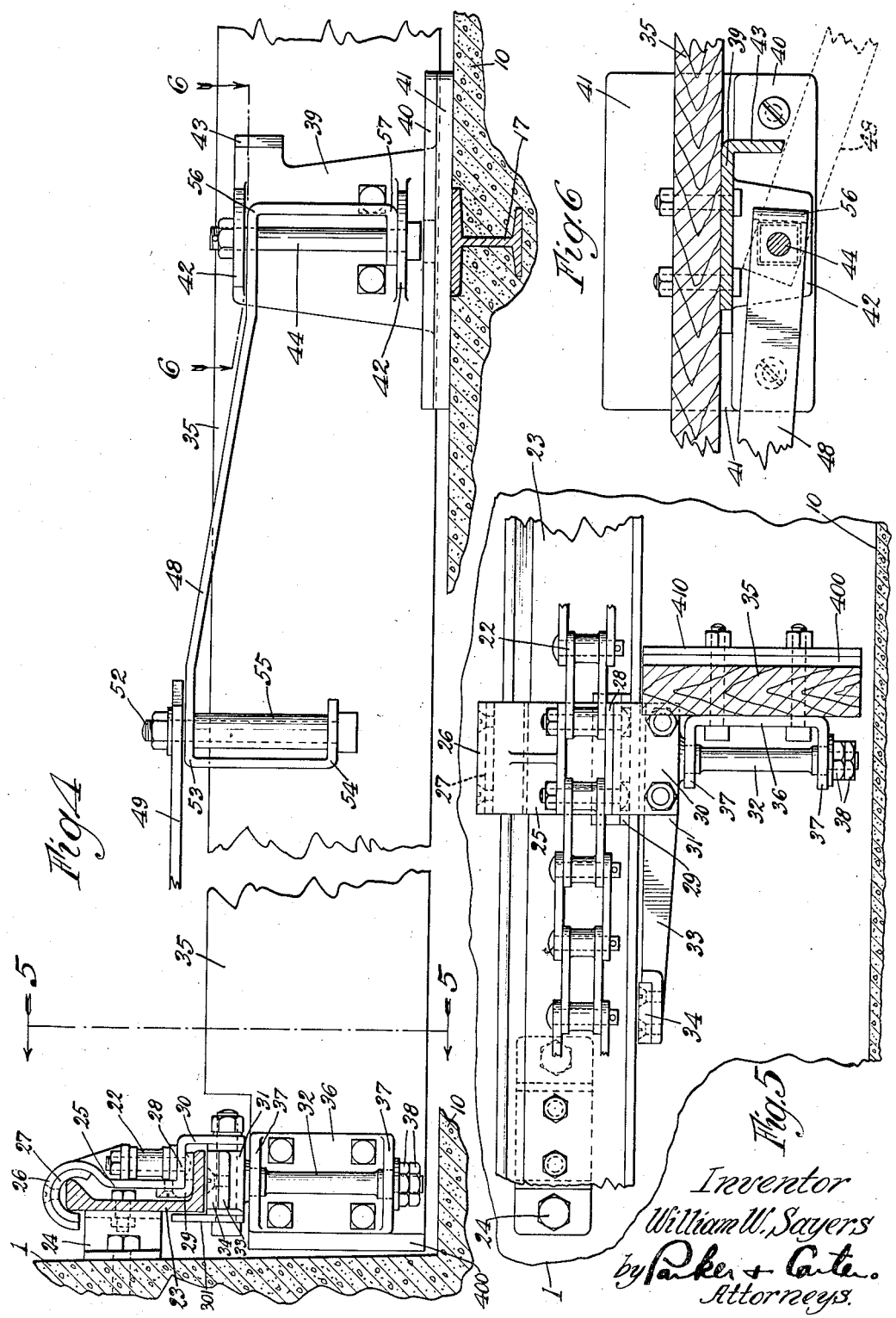

Oct. 19, 1937.       W. W. SAYERS       2,096,409
STRAIGHT LINE COLLECTOR
Filed June 13, 1935       4 Sheets-Sheet 4
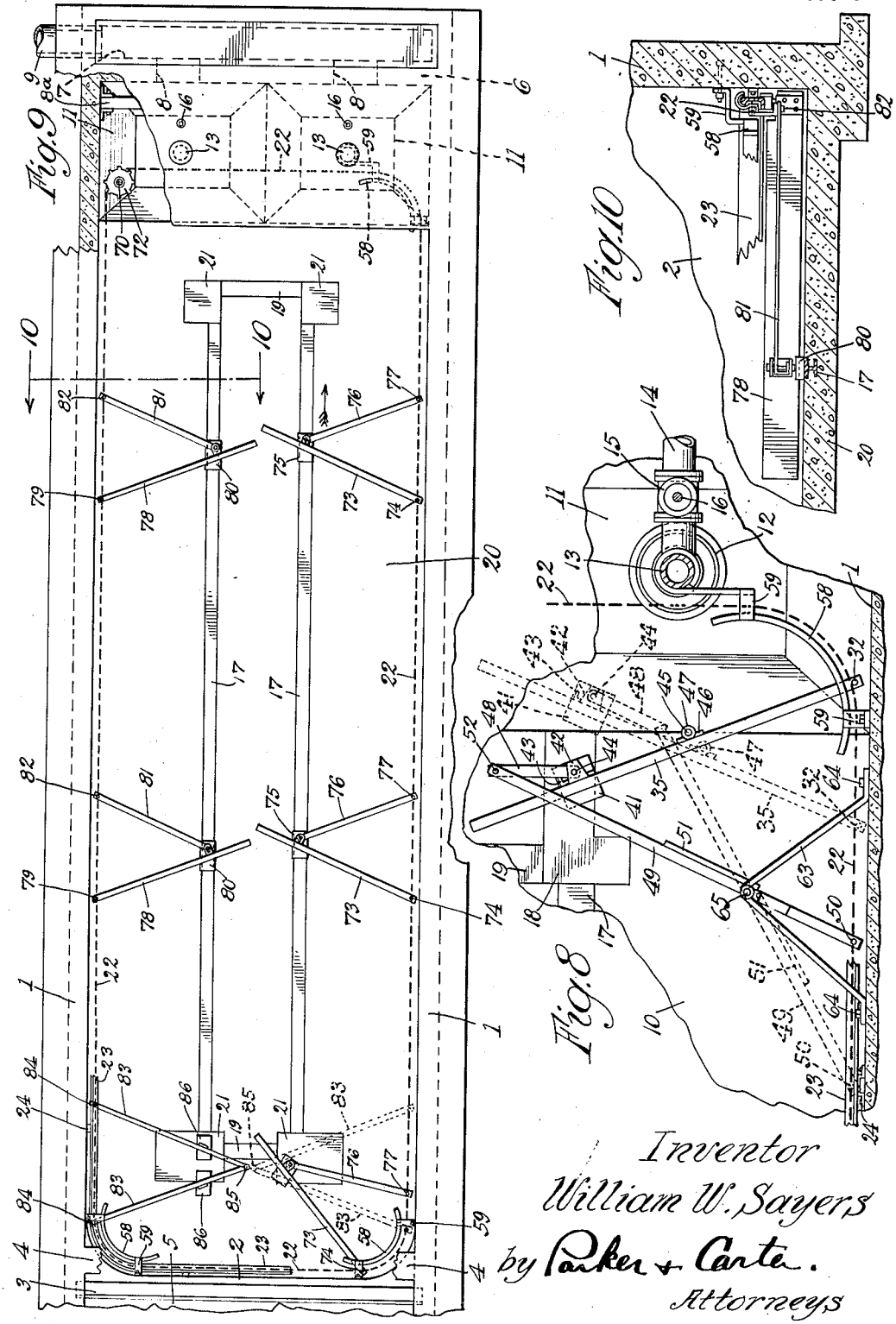
Inventor
William W. Sayers
by Parker + Carter
Attorneys Patented Oct. 19, 1937

2,096,409

UNITED STATES PATENT OFFICE 2,096,409

STRAIGHT LINE COLLECTOR

William W. Sayers, Chicago, Ill., assignor to Link-Belt Company, Chicago, Ill., a corporation of Illinois Application June 13, 1935, Serial No. 26,327

18 Claims. (Cl. 210—55)

This invention relates to a settling and collecting tank and to mechanism for collecting material which has settled within the tank. In the form here shown, it comprises generally an elongated rectangular tank, means for discharging material to it and for withdrawing material from it. Within the tank is positioned a collecting mechanism moving generally along a straight line and arranged to move material which has settled from the liquid within the tank to a discharge trough or hopper at one end of the tank from which the settled material is withdrawn from the system, for further treatment or whatever other disposition is desired.

The invention has for one object therefore to provide means for collecting settled material from fluid within a tank.

Another object is to provide a "straightline" collecting means. A still further object is to provide a collecting mechanism in which a number of flights are moved along the floor of the tank by a single chain and in which the flights are arranged to sweep the entire bottom of the tank.

Another object of the invention is to provide a sludge conveyor comprising a conveying mechanism lying wholly below the surface of the liquid in the tank, adjacent the floor, and operated by a driving mechanism lying largely outside of the tank.

Another object is to provide a conveying mechanism comprising a single strand of chain guided and supported near the bottom of the tank, carrying flights associated with controlling means for causing the flights to move to maintain constantly a position of maximum efficiency.

Another object is to provide in connection with such a conveyor, means whereby material acted upon by the conveyor is moved toward one side of the tank no matter what the direction of movement of the conveying means. Material may be moved from one side of the tank toward the center and then picked up and moved beyond the center toward the other side, or retained in front of the portion of the conveyor moving toward a discharge point.

Other objects of the invention will appear from time to time through the course of the specification and claims.

The invention is illustrated more or less diagrammatically in the accompanying drawings, wherein—

Figure 1 is a plan view of one form of the device;

Figure 2 is a vertical longitudinal section along the line 2—2 of Figure 1;

Figure 3 is a transverse vertical section taken along the line 3—3 of Figure 1 on an enlarged scale;

Figure 4 is a vertical sectional detail taken on a further enlarged scale illustrating in part the conveying chain, the track for it and one of the conveying flights;

Figure 5 is a transverse vertical sectional detail taken along the line 5—5 of Figure 4;

Figure 6 is a horizontal sectional detail taken along the line 6—6 of Figure 4;

Figure 7 is an enlarged plan view with parts broken away and parts in section showing one of the flight shifting and controlling means;

Figure 8 is a partial plan view with parts broken away and parts in section showing another flight shifting means;

Figure 9 is a plan view generally similar to Figure 1 showing a modified form of the invention;

Figure 10 is a transverse sectional detail taken along the line 10—10 of Figure 9 on an enlarged scale;

Figure 11 is a detailed showing of the end of the flight away from the tank wall.

Like parts are indicated by like characters throughout the specification and drawings.

In the form of the invention shown in Figures 1 to 8, inclusive, the collecting mechanism is mounted in an elongated generally rectangular tank which comprises side walls 1, an end wall 2, which may be provided with an adjustable overflow weir 3, and a fixed or adjustable scum baffle 4. An overflow connection or conduit 5 is positioned adjacent the end wall 2. At its opposite end the tank is provided with a second end wall 6, and an influent passage 7 which communicates with the interior of the tank with one or more inflow openings 8. The passage of the influent may be controlled by one or more adjustable gates. A baffle 8a is preferably located within the tank opposite the influent openings. An influent conduit 9 brings material for treatment into the chamber 7 from which it flows into the tank for treatment. 10 is the bottom or floor of the tank and as shown particularly in Figure 3, it preferably slopes toward one side wall. In the bottom of the tank and preferably at one end are located one or more sludge hoppers 11 within each of which is positioned a sludge outlet 12, which connects with a sludge discharge member 13, from which a discharge conduit 14 conducts the sludge. A valve 15 may be positioned in the conduit 14 to control the opening. A rod 16 extends upwardly to a point above the surface of the liquid within the tank for ready manipulation of the valve.

A plurality of tracks 17 are positioned in the floor 10 of the tank and upon these tracks the collecting flights move. At the points where the collecting flights turn, near the corners of the tank, the tracks are enlarged by the insertion of wearing plates 18. Short transverse tracks 19 are positioned between the elongated tracks 17 adjacent their ends.

The tank shown in Figures 9 and 10, is substantially the same as that shown in the earlier described figures except that in place of the inclined floor 10, there is provided a level floor 20. Instead of the wear plates 18 as shown in the earlier described figures, somewhat differently shaped wear plates 21 are provided.

In the form of the device illustrated in the first eight figures, the conveying or collecting mechanism comprises an endless chain 22 which is guided and supported by a track 23 preferably of generally L-section, and this track is largely broken away from the plan views of Figures 1 and 7 for purposes of clearness but in the form of the invention illustrated in those figures it extends completely about the tank, being supported preferably from the side walls of the tank at suitable intervals by brackets 24 shown in detail in Figures 4 and 5. The chain carries engaging and wearing members 25 which as shown in detail in Figure 4 are provided with curved upper portions 26 to extend over the upper flange of the track 23. They may be provided at this point with removable wear members or plates 27. The members 25 are also shaped to provide shoulders 28 upon which removable wear plates 29 are positioned. A portion of the member 25 depends downwardly as at 30 and has bolted to it a member 31 which carries a downwardly projecting bearing arm or stud 32. The member 31 also carries a laterally extending arm 33 preferably integral with it, which arm carries at its outer end a removable wearing plate 34. In certain positions of the chain and associated parts the wearing plate 34 may bear upon the underside of the flange of the track 23. 301 is a guide plate carried by the member 31.

There is one such stud or bearing member for each conveyor flight. As shown in detail in Figures 4 and 5, the flight comprises a member 35 adjacent one end of which a saddle 36, having perforated ears 37 is bolted. The rod or stud 32 extends through the perforations of the ears 37 and the parts are held together by nuts 38.

At a point adjacent its opposite end, each of the flights 35, has secured to it a member 39 which carries a generally horizontal plate-like member 40 to which may be secured a removable wearing plate 41. A pair of perforate ears 42, 42 extend laterally from the member 39. A stop 43 projects laterally from the member 39 at a point separated from the ears 42. A pin 44 is positioned in the perforations of the ears 42. Intermediate its ends and intermediate the members 36 and 39, each flight carries an upwardly projecting pin 45 which may be carried in a socket member 46, as shown in Figures 3, 7 and 8. The pins carry each at their upper ends, rollers 47.

A two-part link or pulling member 48 and 49 extends from the plate 39 and pin 44 on each flight to the point of attachment 50 on the chain. Each such link is formed of a relatively shorter member 48 and a relatively longer member 49. The longer member is attached to the chain 22 at its outer end as at 50 and carries a cam roller contacting plate 51. At its opposite end, the member 49 engages a bearing pin 52 which is carried in the shorter link 48. This latter link is bent as at 53 and 54 and perforated to receive the pin 52. A spacing sleeve 55 may be positioned on the pin 52. At its other end, the link 48 is bent as at 56 and 57 and is perforated and engages the pin 44. A wiper 400 may be carried at the end of the flight 35 adjacent the side wall of the tank. It may be of rubber or other flexible material and held in place by a stiffening plate 410. The ends of the flights away from the walls may also be provided with wipers 420, as shown generally in Figure 3 and in detail in Figuse 11, which are attached by bolts 430 and by a stiffening plate 440. These may be of flexible material and serve, as the flights move, to push solids in front of the flights traveling in the opposite direction, and as the flights pass each other these wiper extensions are bent or deflected. Thus no material is left on the floor of the tank in the center between the ends of the flights.

As illustrated in Figure 11, a flexible wiping member 450 may be positioned along the lower edge of the flights. Ordinarily flights are supported slightly above the bottom of the tank floor and do not directly scrape it. For some purposes they might be arranged to scrape it directly and they might be provided with the flexible scraping or wiping members shown in Figure 11.

In each corner of the tank the track is rounded as shown particularly in Figures 1 and 7 and adjacent the track in each corner an additional rounded chain guiding member 58 is positioned, being supported from the walls of the tank or otherwise by brackets 59. Sprockets or wheels could be used instead of curved guides.

Adjacent one end of the tank and preferably that furthest from the sludge hoppers as shown in plan in Figures 1, 3 and 7, is a cam 60. This cam is secured to the wall of the tank at its ends as at 61, 61 and is provided with a downwardly bent portion 62. It is contacted by the rollers 47 in a manner which will be described below.

Preferably on the same wall of the tank as that which carries the cam 60 but positioned adjacent the sludge hopper is an additional cam 63, which is fastened at its ends as at 64, 64 to the side walls of the tank. As shown in elevation in Figure 3, the cam 63 is shorter than the cam 60 and is positioned at a lower level within the tank. It carries at its inner end, a pin 65 projecting downwardly from it and a roller 66 is mounted upon the pin.

As a means for driving the chain and with it the flights which make up the collector, there is provided a motor 67 positioned above the level of liquid within the tank and preferably entirely outside of the tank. This motor through a coupling 68 and a reduction gearing 69 drives a shaft 70 supported in suitable bearings 71, 71 in the side wall of the tank. At its bottom the shaft 70 carries a driving sprocket 72 which meshes with the chain 22 as shown in Figures 1 and 2. In the form of the invention shown in Figures 1 to 8 inclusive, the chain is driven continuously in one direction. For the particular installation illustrated herewith the direction of motion is that of the arrows of Figure 1.

In the form of the device shown in Figures 9 and 10, the chain arrangement is substantially that shown in the earlier described figures, a chain 22 is supported in a track 23. Guide members 58 are present at the corners as described above, and the driving connection is the same as that just described. However, the chain does not move continuously about the tank but moves first in one direction and then in the other. Any suitable means are provided for reversing the drive. A limit switch or any other mechanism may be used. Since the drive is not continuously about the tank, the direction of the flights differ from that above described in connection with the form of the device in which motion is not reversed. Thus there is a plurality of flights 73 used along one side of the tank as shown in Figure 9. These flights are inclined as shown and are fastened to the chain 22 at their ends 74 and are fastened adjacent their inner ends to bearing shoes 75, which move along one of the tracks 17. Bracing and pushing and pulling link members 76 are associated one with each of the flights 73. These link members are pivotally fastened at their ends 77 to the chain 22 and at their other ends are pivoted to the flights 73 at or near the point where the latter are attached to the bearing shoes 75. A pair of flights 78, similar in construction to the flights 73, are pivotally fastened as at their ends 79 to the chain 22 and are pivotally fastened adjacent their other ends to bearing shoes 80 which run along one of the tracks 17. Bracing or pulling and pushing links 81, similar to the links 76, are fastened as at 82 to the chain 22 and are fastened at their inner ends to the flights 78 adjacent the point of attachment of the latter to the shoes 80. An additional flight which differs in construction from those described may be inserted between the sets of flights 73 and 78. In the form of the invention here shown, it is in reality a double flight consisting of two members 83, 83, each of which is pivotally attached at one end 84 to the chain 22. The flight members 83 are pivotally joined together at their ends as at 85 and they carry intermediate their ends bearing shoes 86.

The use and operation of this invention are as follows:

In the form shown in Figures 1 to 8, inclusive, the chain 22 is driven continuously about the tank moving in the direction of the arrows of Figure 1. Liquid enters the tank from the influent conduit 9 and flows through the openings 8 into the body of the tank, filling it generally to the level shown in Figure 2. This level is determined by the height of the weir 3 which may be made adjustable and liquid is discharged over the weir. Ordinarily the liquid flows through the tank slowly so that settling takes place and the collector thus moves and collects material which is settled upon or near the bottom of the tank.

For simplicity and clarity in the description of the operation, the movement of the flights in the form of the device shown in the first eight figures will be described as being clockwise, and the side of the tank as shown in Figure 1, which is toward the bottom of the sheet, will be referred to as the "near" side, while the opposite side toward the top of the sheet will be referred to as the "far" side.

It will be seen from Figure 1 that those flights which are moving clockwise along the near side wall in that figure are inclined rearwardly and toward the center of the tank with respect to the direction of their motion, hence as the sludge and solids move easily, they carry material along in the direction of movement of the chain, they move it forward and inward toward the center of the tank. This movement toward the center of the tank may be assisted by the inclination of the bottom of the tank which is shown to be inclined in Figure 3.

As the flights move about the left hand end of the tank as shown in Figure 1, their direction of inclination with respect to the chain is altered in a manner to be described below and whereas the flights are inclined forwardly when moving along this wall, as shown in Figure 1. When the flights move along the far side wall they are inclined rearwardly and thus in their travel, retain and convey the sludge and solids and discharge them into one or the other of the sludge hoppers 11 from which it is withdrawn through the conduit 13 and pipe 14. Thus as the flights are moved along the near side wall of the tank they plow or carry sludge in front of them, carrying some sludge around with them and moving a majority of it toward the center of the tank, and the flights moving along the far side receive sludge and solids that have been moved toward the center and also pick up and carry along settled sludge which has not been previously contacted and carry the entire mass along to the sludge hoppers at the right hand end of the tank. Since the flights thus move about the entire tank and since as shown in Figure 3 their ends almost contact, or actually contact, if they are provided with the flexible members shown in detail in Figure 11, the entire bottom of the tank is swept by the flights.

There is shown in Figure 7 diagrammatically the shifting movement which takes place when the flights enter the corner formed by near side wall and left hand end wall of the tank, as shown in Figure 1. Three positions of a flight and its links are shown in that figure. As shown in full lines, the flight occupies the position which it has occupied during its movement along the near side wall or away from the sludge hoppers. As shown in dotted lines, the shifting of the flight has commenced. As the flight moves toward the corner, the roller 47 contacts the cam portion 62 and the cam and the effect of sludge and water pressure upon the face of the flight as it is pulled ahead, hold the flight against rotation backwardly. As the corresponding link 49 now moves about the corner being guided by the member 58, since the flight cannot swing rearwardly or alter its angle of inclination, the link 49 is forced to swing rearwardly and the short link 48 also swings rearwardly. As soon as the roller 47 moves off of the cam, the effect of the forward moving chain causes a further backward swinging movement of the flight, to the dot and dash position of Figure 7. As the flight reaches this dot and dash position, the link 49 has moved further to the rear carrying with it the link 48 and the link 49 swings past the pivot 44 of the link 48. The parts then reach the relative position shown in the upper half of Figure 1 in which the flights are inclined forwardly with respect to their direction of travel.

The flights retain the position shown along the far side wall of Figure 1 in their travel and until they pass around drive sprocket 72, across the sludge hoppers at the right end wall, and around the curve adjacent the cam 63. As their movement continues past the sludge hoppers, the plate 51 on the link 49 contacts the roller 65 on the cam support 63, as shown in Figure 8 in full lines. As the chain and flight now continue to move along the near side wall from the position shown in full lines in Figure 8, the link 49 swings backward to the dotted line position of Figure 8 and thus causing the short link 48 to swing inwardly about its pivot 44. As the flight continues to travel forward and the long link 49 and short link 48 swing from the full line position of Figure 8 to the dotted line position of that figure, thus regaining the forward angle of inclination which they retain throughout their travel along the near side wall, it moves material toward the center of the tank and in front of flights on far side of the tank.

The automatic shifting of the flights and their continued movement about the tank to urge or plow material toward the far side wall of the tank and to convey material to and discharge it into the sludge hoppers continues as long as the driving mechanism moves the chain.

In the modified form of the invention shown in Figures 9 and 10 the chain does not move continuously in one direction. Its direction of movement is automatically reversed by limit switches or any other desirable controlling device. The mechanism comprises flights, two sets of oppositely inclined surfaces. Their inclination is such that the material is moved toward the center of the tank and plowed from one set of flights toward the set on the opposite side of the tank, so that it is first moved toward the center of the tank and then picked up and moved toward the far side, and finally discharged into the sludge hoppers by the reciprocating flight movement. In this form of the device the bottom of the tank is level as indicated in Figure 10.

While the amount of movement of the flights may vary, it is preferable to give them at least sufficient movement to move the flights 83, 83 from the full line position of Figure 9, to the dotted line position of that figure and as the parts are shown in Figure 9, counter-clockwise movement is commencing, at the corner formed by near side wall and left hand end wall, and continues in that direction until the flight 83, 83 has moved from the full line to the dotted position. All of the other flights being fastened to the same chain will move correspondingly. With counter-clockwise movement, the flights along the near side wall carry material toward and discharge a portion of it into the sludge hopper. The flights along the far side wall will plow and move material to the center of the tank and in front of the flights along the near side wall. When the direction of movement of the flights is reversed, those along the near side wall will plow the material toward the center of the tank and in front of the flights along the far side wall which convey the material toward and discharge a portion of it into the sludge hopper. Thus by the back and forth movement of the flights, material is conveyed and discharged into the sludge hopper, by the opposed sets of flights and this conveying movement continues as long as the operating mechanism continues to run.

I claim:

1. In a conveyor, a flexible member, means for guiding it along a path which includes two generally oppositely spaced zones, flights movably attached to said flexible member and angularly disposed thereto, means for moving said flexible member and flights through one said zone and in an opposite direction through the other said zone, and means for reversing the angular relationship between the flights and the flexible member in relation to its travel through one zone as contrasted to the other.

2. In a conveyor, a flexible member, means for guiding it along a path which includes two generally oppositely spaced zones, flights movably attached to said flexible member and angularly disposed thereto, means for moving said flexible member and flights through one said zone and in an opposite direction through the other said zone, and means for reversing the angular relationship between the flights and the flexible member in relation to its passage through one zone as contrasted to the other, said conveyor being mounted in a tank having an inclined bottom, said flights lying generally parallel and close to said bottom.

3. In a conveyor, a flexible member, means for guiding it along a path which includes two generally oppositely spaced zones, flights movably attached to said flexible member and angularly disposed thereto, means for moving said flexible member and flights through one said zone and in an opposite direction through the other said zone, and means for reversing the angular relationship between the flights and the flexible member in relation to its passage through one zone as contrasted to the other, said flights being positioned as they move in one direction to propel material toward the flights in the opposite zone.

4. In a conveyor, a flexible member, means for guiding it along a path which includes two generally oppositely spaced zones, flights movably attached to said flexible member and angularly disposed thereto, means for moving said flexible member and flights through one said zone and in an opposite direction through the other said zone, and means for reversing the angular relationship between the flights and the flexible member in relation to its passage through one zone as contrasted to the other, said conveyor being mounted in a tank, said flights lying generally parallel to the bottom of said tank, the flexible member lying adjacent one wall of the tank, each flight having one end guided by said flexible member.

5. In combination with a tank, a conveyor mounted therein, said conveyor comprising a flexible member extending around the tank and a plurality of flights attached to said flexible member, means for moving the flexible member to move the flights around the tank, the flights being positioned close to the bottom of the tank, the flights being angularly so disposed with respect to the flexible member that as they move about the tank, material adjacent the bottom thereof is moved across the tank in a step by step movement and conveyed toward one end thereof.

6. In combination with a tank, a conveyor mounted therein, said conveyor comprising a flexible member extending around the tank and a plurality of flights attached to said flexible member, means for moving the flexible member to move the flights about said tank, the flights being positioned close to the bottom of the tank, the flights being angularly so disposed with respect to the flexible member that as they move about the tank, material adjacent the bottom thereof is moved partially across the tank by flights on one side of the tank and is subsequently moved further across the tank by flights on the opposite side of the tank and conveyed toward one end thereof, said tank having an inclined bottom, the direction of movement of material across the tank being toward the lower part of the inclined bottom.

7. In combination with a tank, adapted to hold liquid, means for collecting material which has settled from the liquid comprising unitary means for moving the material toward the center of the tank and additional means for thereafter moving it toward one side of the tank and for conveying it when so moved toward a point of discharge, said unitary means comprising a flexible member positioned about the tank, and means for moving it, movable scraper elements attached to said flexible member, means for causing said scrapers to move with respect to said flexible member and for holding them in position to direct material progressively toward one edge of the tank during their entire excursion about the tank.

8. In combination with a tank having an inclined bottom, adapted to hold liquid, means for collecting material which has settled from the liquid comprising unitary means for moving the material first toward the center of the tank and additional means for thereafter moving it toward one side of the tank and for conveying it when so moved toward a point of discharge, said unitary means comprising a flexible member positioned about the tank, and means for moving it, movable scraper elements attached to said flexible member, means for causing said scrapers to move with respect to said flexible member and for holding them in position to direct material progressively toward one edge of the tank during their entire excursion about the tank.

9. In combination in a tank adapted to contain liquid, means for collecting solids which have settled from the liquid, which means comprise an endless chain positioned circumferentially adjacent the bottom of the tank, a track for guiding the chain extending about the tank adjacent its bottom, means on the chain for engaging the track, and a plurality of flights movably attached to the chain adapted to move with it about the tank, means fixed with respect to the tank adapted to contact said flights to cause them to shift their position with respect to the direction of chain movement.

10. In combination, a tank adapted to contain liquid, means for collecting solids which have settled from the liquid, which means comprise an endless chain positioned adjacent the bottom of the tank, a track for guiding the chain extending about the tank adjacent its bottom, means on the chain for engaging the track, and a plurality of flights movably attached to the chain adapted to move with it about the tank, tracks in the bottom of the tank, shoes on the flights, positioned to run on said tracks and means fixed with respect to the tank adapted to contact said flights to cause them to shift their position with respect to the direction of chain movement, the bottom of the tank being sloped toward one side, the flights being positioned throughout their excursion about the tank to move material constantly toward the low side of the tank.

11. In combination, a generally rectangular tank, having a bottom sloped toward one side, a material discharge hopper in said tank, adjacent one end, and means for withdrawing material from said hopper, an endless chain positioned about said tank and adjacent its bottom, and means for causing said chain to move, a guiding and supporting track for said chain, flights movably attached at one end of each to said chain, shoes on said flights, separated from the points of attachment of the flights to the chain, said shoes running along the bottom of the tank, movable links one for each flight, said links being attached to said chain and to said flights, and means fixed in said tank for contacting said flights and links to cause them to move with respect to the chain whereby said flights in all positions urge material toward the low side of the tank and move it toward the discharge hopper.

12. In combination with a tank adapted to contain liquid, means for collecting material settled from the liquid, said means comprising a collecting means movably mounted within the tank and means to move it, said collecting means comprising a flexible member positioned circumferentially about said tank, substantially rigid flights attached thereto and positioned angularly with respect thereto and means for moving said flexible member, said flights so disposed with respect to their direction of movement that they urge material toward one side of the tank and convey it toward a point of discharge and means for holding said flights in a number of different angular positions with respect to said flexible member at different points in the excursion of the latter, and means for changing said angular positions.

13. In combination, a generally rectangular tank having a transversely inclined floor and a sludge hopper at one end, means for moving settled material downwardly across the inclined floor and for moving it in a generally straight line in a direction away from the sludge hopper on the upper portion of the floor and in a generally straight line toward the sludge hopper on the lower portion of the floor, said means comprising a rigid straight conveyor flight means for maintaining it at all times in working relationship with and adjacent to the floor, and for holding it in such position that at all times one end is adjacent to the wall of the tank, the other end extends to and terminates adjacent to the center of the tank, means for moving the flight continuously in a forward direction away from the sludge hopper along one wall of the tank and back toward the sludge hopper along the other wall of the tank and for causing it in one complete excursion to sweep substantially the entire area of the floor.

14. In combination, a generally rectangular tank having a transversely inclined floor and a sludge hopper at one end, means arranged adjacent the upper portion of the floor for moving settled material downwardly across the floor and in a direction away from the sludge hopper, means adjacent the lower portion of the floor for receiving the settled material from the upper portion of the floor, moving it transversely downwardly along the floor and in a direction toward the sludge hopper.

15. In combination, a generally rectangular tank having a transversely inclined floor and a sludge hopper at one end, conveying means arranged about the tank and adjacent the upper portion of the floor for moving settled material downwardly across the floor and in a direction away from the sludge hopper, said means also adjacent the lower portion of the floor for receiving the settled material from the upper portion of the floor, moving it transversely downwardly along the floor and in a direction toward the sludge hopper, said conveying means comprising a plurality of flights, and a flexible member for moving them in a direction away from the hopper along the upper portion of the floor and in a direction toward the hopper along the lower portion of the floor.

16. In combination, a generally rectangular tank having a transversely inclined floor and a sludge hopper at one end, conveying means arranged about the tank and adjacent the upper portion of the floor for moving settled material downwardly across the floor and in a direction away from the sludge hopper, said means also adjacent the lower portion of the floor for receiving the settled material from the upper portion of the floor, moving it transversely downwardly along the floor and in a direction toward the sludge hopper, said means comprising a plurality of flights, and a flexible member for moving them in a direction away from the hopper along the upper portion of the floor and in a direction toward the hopper along the lower portion of the floor, the flights moving away from the hopper being rearwardly inclined from the wall of the tank, the flights moving toward the hopper being forwardly inclined from the wall of the tank.

17. In combination, a generally rectangular settling tank, a series of scraper blades mounted for movement adjacent the bottom thereof in two parallel groups, each group having one end adjacent the wall of the tank and the other end adjacent the longitudinal center line of the tank, means for moving the blades in opposite directions, the blades in one group being rearwardly inclined, the blades in the opposed group being forwardly inclined, the said moving means being effective to move the blades of the two groups in opposite directions simultaneously and to move them past each other.

18. In combination, a generally rectangular tank, a series of scraper flights mounted for movement along the bottom thereof in opposed groups, each group having one end terminating adjacent the wall of the tank, the other end terminating adjacent the center line, the flights in each group being oppositely inclined and means for moving the flights in each group in opposite directions, a sludge hopper at one end of the tank, the blades in one group being adapted to move sludge in a direction away from the hopper and in a direction inwardly from the wall of the tank toward the path of the opposed group of blades, the other group of blades being adapted to move sludge toward the wall of the tank and toward the hopper.

WILLIAM W. SAYERS.